United States Patent [19]

Visser et al.

[11] 3,865,916

[45] Feb. 11, 1975

[54] PARTIAL COMBUSTION PROCESS SOOT PELLETS OF INCREASED STRENGTH AND THEIR PREPARATION

[75] Inventors: Pieter Visser; Johannes Boom, both of Amsterdam, Netherlands

[73] Assignee: Shell Oil Company, New York, N.Y.

[22] Filed: Aug. 28, 1972

[21] Appl. No.: 284,359

[52] U.S. Cl. .................... 264/85, 264/117, 23/314
[51] Int. Cl. ............................................... B01j 2/00
[58] Field of Search ................ 264/117, 85; 23/314

[56] References Cited
UNITED STATES PATENTS
2,903,423   9/1959   Mondria et al. ....................... 23/314
3,449,483   6/1969   Quist .................................... 264/117

Primary Examiner—Robert F. White
Assistant Examiner—J. R. Hall, Jr.
Attorney, Agent, or Firm—A. A. Jecminek

[57] ABSTRACT

Soot contained in small concentration in a gas stream containing largely hydrogen and carbon monoxide produced by reaction of a hydrocarbonaceous fuel with insufficient oxygen for complete combustion in the presence of steam is recovered and converted to hard pellets suitable as absorbent and clarifying agent. The soot is scrubbed from the reducing gas stream with water. The resulting suspended soot-in-water is agglomerated into soft pellets by agitating the water suspension with a small proportion of a light hydrocarbon in the presence of a non-volatile adherent agent which is convertible on heating to a pellet reinforcing agent. The resulting pellets are separated, dried, devolatized (to remove the light hydrocarbon) and consolidated into hard, rigid, porous, absorbent, pellets by heating under low or non-oxidizing conditions of 300° to 3,000° C.

1 Claim, No Drawings

PARTIAL COMBUSTION PROCESS SOOT PELLETS OF INCREASED STRENGTH AND THEIR PREPARATION

BACKGROUND OF THE INVENTION

For a number of years there has been considerable work carried on in the laboratory resulting in commercialization of processes which produce reducing gas streams of hydrogen and carbon monoxide by partial combustion of carbonaceous feeds, such as hydrocarbon gases, naphthas and fuel oils and even residues, tars, coal and the like. The purpose has been to obtain a maximum of reducing gas and a minimum of soot, consistent with practical means and economics and ultimate use. An extensive number of patents assigned to Texaco and to Shell have described combustion devices and reaction zones for effecting the partial combustion, apparatus and methods for recovering combustion heat from the hot gases, methods of removing the soot from the reducing gases, methods of recovering and recycling the soot to the combustion zone, and the like.

some of the representative patents which describe suitable carbon recovery methods are: U.S. Pat. No. 2,665,980, Jan. 12, 1954; U.S. Pat. No. 2,903,423, Sept. 8, 1959; U.S. Pat. No. 2,992,906, July 18, 1961; U.S. Pat. No. 3,230,282, Jan. 18, 1966; and Netherland application No. 6915491 corresponding to co-pending U.S. application, Ser. No. 72,741, filed Sept. 16, 1970.

The soot can be removed from the gas by contacting the gas with water, whereby a suspension of soot in water is obtained. The soot has to be separated from the water to clean up the water for re-use or discharge. The soot recovered represents a considerable value, since it can be used, for instance, as fuel. The soot can be separated from the water by setting the soot suspension in turbulent motion, with addition of one or more light hydrocarbons as binder. The binder displaces the water from the surface of the soot particles, which upon subsequent contact will stick together. The agglomerates thus formed may be more or less spherical. The size and shape depend on the nature of the turbulent motion, on the concentrations of the soot and the auxiliary material, on the temperature and on the duration of the agglomerization process. A very suitable method is described in the aforementioned U.S. Pat. No. 3,230,282, according to which pellets 2–6 mm in diameter are made from soot particles with a particle size of about 10 microns.

Many types of hydrocarbons are used as binder, such as gasoline, naphtha, gas oil, fuel oil and bitumen. Products like toluene may also be used. The use of light hydrocarbons has the advantage that the binder can be recovered, for instance by combining the agglomerates with hot, heavy fuel, as a result of which the light hydrocarbons and the soot is taken up into the fuel. In this case pellets are not obtained. Pellets are obtained if the light hydrocarbons are evaporated from the pellets without contacting the mass with another liquid. If the pellets are to be stored or transported, they should have a greater mechanical strength than the ones thus obtained. This requirement can be met by the use of heavy oils or bitumen as binder. As long as the pellets so obtained are merely used as fuel, all that is required of them is that they shall not pulverize too quickly or stick together during transport or storage, which conditions can be amply fulfilled by well-known techniques.

Usually, for economy, the recovered soot is returned with fuel to the partial combustion zone. It has been proposed in U.S. Pat. No. 3,124,529, March 10, 1964, to convert the highly hydrophobic carbon black produced by a controlled partial combustion of hydrocarbons to hydrophilic activated carbon useful for decolorizing aqueous solutions. It has also been proposed to improve furnace black for use in inks, avoiding compacting of the black to form hard aggregates within the pellet, by uniformly distributing on the furnace black particles a non-evaporable, non-polymerizable organic liquid and then pelletizing the mass by a suitable tumbling action. A small amount of mineral oil containing a bitumen may be used. The resulting pellets were readily and completely dispersible in the ink medium.

British Pat. No. 1,078,113, Aug. 2, 1967, discloses that carbon black can be pelletized by agitating with 30–70% water, but that this process has drawbacks. It describes pelletizing flocculent carbon black with a volatile organic liquid in a pelletizing mixer, with subsequent drying and volatilization of the volatile liquid in a fluid bed drier. An extender oil may be included.

Soot originating from a process for the manufacture of gas as mentioned above, has particularly attractive porosity properties, which render it suitable for use as a sorbent. The specific surface area and the pore volume in particular prove to have exceptionally high values. Pelletization of this soot according to the well-known techniques, however, either causes a sharp decline in porosity, or yield pellets with a very low mechanical strength, which can hardly be handled. The invention now provides a process by which these difficulties are overcome.

SUMMARY OF THE INVENTION

The invention relates to a process for the pelletization of soot from a suspension thereof in water, originating from a process for the manufacture of reducing gas containing carbon monoxide and hydrogen and a small proportion of soot (less than 5% of the carbon content of the feed) by a partial combustion of hydrocarbons, by setting this suspension in turbulent motion, with addition of one or more light hydrocarbons as binder, the pellets being separated from the surrounding liquid and dried, in which the pelletization takes place in the presence of a non-volatile, pellet-reinforcing additive, which is consolidated by a thermal after-treatment of the dried pellets at a temperature of 300° – 3,000° C.

The dispersion being in turbulent motion, the binder and the pelletreinforcing additive will spread uniformly over the soot particles. The binder consists of a light hydrocarbon or of a mixture of light hydrocarbons, such as gasoline or naphtha, by which the soot particles are preferentially wetted. The soot particles then agglomerate to form pellets. These pellets can be separated from the liquid, for instance by filtration, or with the aid of a cyclone. Depending on the agglomeration technique applied, the liquid may be water or binder. The pellets thus obtained still contain some binder, mainly between the particles and in the pores. The pellets also contain the pellet-reinforcing additive. Depending on its nature, the additive is present exclusively between the soot particles or also in the pores. The pellets obtained are still rather weak and, owing to the pores being filled, the porosity properties are still very poor. It is recommended that, prior to the thermal after-treatment, the pellets are dried entirely or substantially by evaporating the binder, for instance by fluidization of the pellets with the aid of a gas stream at a suitable temperature, which for gasoline, for instance, is 120° C. The non-volatile additive is left behind. Subsequently the thermal after-treatment is carried out at a temperature of at least 300° C. What temperature is selected depends on the nature of the additive. The temperature selected will be so high that consolidation occurs, for instance by thermal cracking and carbonization if the additive consists of organic material, or by melting or otherwise, as will be further explained below. As a result, the mechanical strength of the pellets is strongly increased and the porosity properties are maintained or restored.

A very suitable additive is one consisting of a bituminous product. This may be an asphaltic bitumen or a tar product. It can be added in a quantity of 1 – 20%w, calculated on soot. The thermal after-treatment can take place at 350° – 800° C in an oxygen-deficient gas atmosphere, for instance in nitrogen. At a temperature of 350° – 400° C a gas with a low oxygen content, for instance not higher than 10%v, can be used. It may be desirable for the bituminous additive to be dissolved in the binder and thus added to the suspension in which case an aromatic binder such as toluene is suitable. The bituminous additive may, however, also be dispersed in the binder in the form of very fine particles. At a temperature of 350° – 800° C thermal cracking of the bitumen occurs. Volatile cracking products are entrained with the gas and a carbonaceous residue is left behind which affords a strong cohesion of the soot particles. Since the bitumen — if dissolved in the binder — which has entered the pores of the soot is also cracked, the pores remain accessible. If powdered bitumen is used, then after the agglomeration, the pores will only contain volatile binder, which will be completely expelled by evaporation. Besides a bituminous product a residual fuel or asphaltenes can be used.

The porosity properties can be further improved when the thermal after-treatment is carried out with a gas which contains steam, for instance in a quantity of at least 25%v, or which consists of steam. As a result of a chemical reaction between steam and carbonaceous cracking residue an additional part of the latter is converted to volatile products.

The pellet-reinforcing additive can also consist of material having a fibrous structure. Very suitable is fibrous organic material consisting of a polymeric substance, such as nylon, polypropene, polyethene. The thermal after-treatment can then take place at 300° – 400° C, causing the polymeric fibers to melt and cohere to each other and to the soot particles. Other organic materials like cellulose and wool can also be used, as well as fusible, high-melting inorganic materials such as glass wool.

The additive can also consist of glass powder, for instance in a quantity of 2 – 40%w, calculated on soot. The particle size may be 5 – 500 microns. The thermal after-treatment can then be carried out at a temperature within the softening range of the glass. Here again melting causes agglomeration of the glassy material around, and with the soot particles.

The additive can also consist of argillaceous material. It can be added in a quantity of 5 – 100%w, calculated on soot. The thermal aftertreatment can then take place at a temperature of 1,600° – 2,000° C. Suitable materials are bentonite or kaoline.

The thermal after-treatment can very suitably be carried out in a fluidized bed, as can the drying of the pellets. The beds can be continuously operating fluidized beds, connected in series.

The pellets can very suitably be used in a sorption process, in particular for the purification of water. For instance, the water originating from filtration of the activated sludge obtained in biological waste water purification, can be purified by passing it through a bed of the pellets concerned.

Specific embodiments of the invention are illustrated by the following examples.

Parts of an aqueous soot slurry were agglomerated using gasoline or toluene as binder and various quantities of bitumen as pellet-reinforcing additive. The data in Table I show what after-treatment was applied and what properties were obtained.

Table I

| Exp. No. | Binder | additive %w of bitumen on soot | thermal after-treatment: ½ h in 80% $H_2O$ + 20% $N_2$ | pore volume, $cm^3/g$ | surface area, $m^2/g$ |
|---|---|---|---|---|---|
| 1 | toluene | — | — | 1.45 | 1114 |
| 2 | toluene | 3 | — | 1.48 | 942 |
| 3 | toluene | 3 | 800°C | 1.82 | 1265 |
| 4 | toluene | 15 | 800°C | 1.82 | 1015 |
| 5 | gasoline | — | 800°C | 2.00 | 1306 |

Thermal after-treatment at 800° C yielded products of high pore volume and surface area values. The highest figures are attained using gasoline as binder and thermal after-treatment. In the order of experiment numbers 1 – 5 – 2 – 3 – 4 pellets with increasing mechanical strength were obtained.

Table II shows another series of experiments, carried out with toluene as binder and polystyrene as additive. Thermal after-treatment during 0.5 hour in an atmosphere of $CO_2$ and at temperatures ranging from 350°–640° resulted in strong pellets with very good adsorption properties. The adsorption was measured with methylene blue (MB) in a solution with a residual concentration of 10 ppm.

Table III

| Exp. No. | additive, %w of polystyrene on soot | temp. of thermal after-treatment °C | adsorption mg MB/g |
|---|---|---|---|
| 1 | 147 | 350 | 25 |
| 2 | 147 | 390 | 70 |
| 3 | 147 | 500 | 200 |
| 4 | 147 | 640 | 200 |
| 5 | 100 | 350 | 120 |

In the order of experiment numbers 5 – 3 – 4 – 2 – 1 pellets with increasing mechanical strength were obtained.

We claim as our invention:

1. A process for pelletization of soot particles suspended in water originating from a process for the manufacture of reducing gas containing carbon monoxide, hydrogen and soot by partial combustion of hydrocarbons, said soot being present in the reducing gas product in an amount which is equivalent to less than 5% of the carbon content of the hydrocarbon feed comprising:
   a. setting said suspension in a turbulent motion
   b. adding both a hydrocarbon binder component selected from the group consisting of a light, liquid hydrocarbon and mixtures of light liquid hydrocarbons boiling below 300° C and a pellet reinforcing additive component which is non-volatile at the conditions at which the light liquid hydrocarbon binder evaporates to the suspension in turbulent motion whereby the binder and pellet reinforcing additive spread uniformly over the soot particles in said suspension causing said soot particles to agglomerate and form pellets;
   c. separating the resulting agglomerated pellets from the suspending liquid;
   d. drying said agglomerated pellets and removing the hydrocarbon binder by evaporation and
   e. heating under non-oxidizing conditions at a temperature of 300°–3,000° C thereby consolidating the agglomerated pellets into porous, absorbent pellets suitable as absorbent and clarifying agents.

2. A process according to claim 1, wherein the pellet reinforcing additive is a bituminous product.

3. A process according to claim 2, wherein the bitumen is added in a quantity of 1–20%w, calculated on soot.

4. A process according to claim 3, wherein the bituminous additive is dissolved in the binder prior to adding the binder to the suspension.

5. A process according to claim 4, where step (e) takes place at 350°–800°C in a nitrogen gas atmosphere.

6. A process according to claim 5, wherein the nitrogen gas contains at least 25% steam.

7. A process according to claim 1, wherein the pellet reinforcing additive is an organic material with a fibrous structure.

8. A process according to claim 7, wherein the fibrous material is of a polymeric substance.

9. The process according to claim 3, wherein step e) takes place at 350°–400° C in a gas atmosphere having an oxygen content not higher than 10%v.

* * * * *